United States Patent
Brackman et al.

(10) Patent No.: US 9,027,007 B2
(45) Date of Patent: May 5, 2015

(54) REDUCING EXCESSIVE COMPILATION TIMES

(71) Applicant: QUALCOMM Incorporated, San Diego, CA (US)

(72) Inventors: David Samuel Brackman, San Diego, CA (US); Chu-Cheow Lim, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 13/787,485

(22) Filed: Mar. 6, 2013

(65) Prior Publication Data

US 2014/0258996 A1    Sep. 11, 2014

(51) Int. Cl.
*G06F 9/45* (2006.01)

(52) U.S. Cl.
CPC . *G06F 8/443* (2013.01); *G06F 8/41* (2013.01)

(58) Field of Classification Search
CPC ....... G06F 3/126; G06F 9/50; G06F 2217/84; G06F 8/41
See application file for complete search history.

(56) References Cited

U.S. PATENT DOCUMENTS

| | | | | |
|---|---|---|---|---|
| 5,768,595 | A * | 6/1998 | Gillies | 717/145 |
| 6,438,741 | B1 * | 8/2002 | Al-omari et al. | 707/694 |
| 7,290,240 | B1 | 10/2007 | Lam-Leventis et al. | |
| 7,428,731 | B2 | 9/2008 | Wu et al. | |
| 7,698,696 | B2 | 4/2010 | Ogawa et al. | |
| 8,181,169 | B2 | 5/2012 | Nakaike et al. | |
| 2003/0009701 | A1 * | 1/2003 | Kurosawa | 713/300 |
| 2003/0237080 | A1 | 12/2003 | Thompson et al. | |
| 2006/0107258 | A1 * | 5/2006 | Takabatake | 717/151 |
| 2006/0236310 | A1 | 10/2006 | Domeika et al. | |
| 2007/0061793 | A1 * | 3/2007 | Inglis et al. | 717/151 |
| 2008/0066061 | A1 * | 3/2008 | Gellerich | 717/140 |
| 2008/0071759 | A1 * | 3/2008 | Santosuosso | 707/4 |
| 2010/0313189 | A1 * | 12/2010 | Beretta et al. | 717/148 |
| 2011/0088022 | A1 * | 4/2011 | Kruglick | 717/153 |
| 2011/0154304 | A1 * | 6/2011 | Fulton et al. | 717/140 |
| 2014/0258997 | A1 * | 9/2014 | Lim et al. | 717/151 |
| 2014/0331215 | A1 * | 11/2014 | Bowler et al. | 717/151 |

FOREIGN PATENT DOCUMENTS

EP    0908818 A2    4/1999

OTHER PUBLICATIONS

Jeffry T. Russell et al.; Software Power Estimation and Optimization for High Performance 32-bit Embedded Processors; 1998 IEEE; 6 pages; <http://ieeexplore.ieee.org/stamp/stamp.jsp?tp=&arnumber=727070>.*

(Continued)

*Primary Examiner* — Thuy Dao
*Assistant Examiner* — Cuong V Luu
(74) *Attorney, Agent, or Firm* — Shumaker & Sieffert, P.A.

(57) ABSTRACT

In one example, a device includes one or more processors configured to determine an allocated time for execution of an optimization pass for optimizing code for a software program, execute at least some instructions of the optimization pass on the code, and, in response to determining that an actual time for execution of the optimization pass has exceeded the allocated time for execution, preventing execution of subsequent instructions of the optimization pass.

21 Claims, 4 Drawing Sheets

(56) References Cited

OTHER PUBLICATIONS

Timothy J. Callahan; The Garp architecture and C compiler; 2000 IEEE; pp. 62-69; <http://ieeexplore.ieee.org/stamp/stamp.jsp?tp=&arnumber=839323>.*

Sandhya Dwarkadas; An Integrated Compile-Time/Run-Time Software Distributed Shared Memory System; 1996 ACM; pp. 186-197; <http://dl.acm.org/citation.cfm?id=237181>.*

Vasanth Bala et al.; Dynamo A Transparent Dynamic Optimization System; 2000 ACM; 12 pages; <http://dl.acm.org/citation.cfm?id=349303>.*

Edson Borin et al.; TAO Two-level Atomicity for Dynamic Binary Optimizations; 2010 ACM; pp. 12-21; <http://dl.acm.org/citation.cfm?id=1772954.1772959>.*

Antoine Fraboulet et al.; Loop Alignment for Memory Accesses Optimization ; 1999 IEEE; 7 pages; <http://dlacm.org/citation.cfm?id=857198.857950>.*

Burnes, "GeForce Experience Closed Beta Released," Article in GeForce, Dec. 5, 2012, Retrieved from: http://www.geforce.com/whats-new/articles/geforce-experience-closed-beta-released.

U.S. Appl. No. 13/787,507, filed on Mar. 6, 2013.

Fursin, et al., "Milepost GCC: Machine Learning Enabled Self-turning Compiler," International Journal of Parallel Programming, vol. 39, No. 3, Jun. 2011, pp. 296-327.

Harris, et al., "Controlling run-time compilation," Dec. 1998, pp. 75-85.

International Search Report and Written Opinion—PCT/US2014/014597—ISA/EPO—May 2, 2014, 14 pp.

Koes, et al., "A Global Progressive Register Allocator," Proceedings of the 2006 ACM Sigplan Conference on Programming Language Design and Implementation, Jun. 2006, pp. 204-215.

* cited by examiner

REDUCING EXCESSIVE COMPILATION TIMES

TECHNICAL FIELD

This disclosure relates to compilers.

BACKGROUND

A device that provides content for visual presentation generally includes a GPU. The GPU renders pixels that are representative of the content on a display. The GPU generates one or more pixel values for each pixel on the display and performs graphics processing on the pixel values for each pixel on the display to render each pixel for presentation. The rendering process may include execution of one or more shader programs, which may modify the pixel values.

Programmers typically utilize high-level coding languages that are understandable to human users to develop software, that is, a set of instructions for a computer. Such instructions are typically compiled, that is, converted from the high-level coding language to low-level object code (sometimes referred to as machine code), which can be executed by a processor, e.g., a general purpose processor or a graphics processing unit (GPU). Compilation can be performed prior to execution or at the time of execution, sometimes referred to as "just-in-time" compilation. For example, shader programs for GPUs are often compiled just-in-time.

Compilers may be configured to perform various optimization tasks. Such optimizations may include attempting to reduce memory consumed during execution of the compiled code, to increase speed at which the compiled code can be executed, and the like. Some code optimization problems have been shown to be nondeterministic polynomial time (NP)-complete, or even undecidable. Accordingly, code optimization processes can take a relatively long amount of time to perform, and can be both processor- and memory-intensive.

SUMMARY

In general, this disclosure describes various techniques related to improving compiler optimization. Such techniques may be used during just-in-time compilation, e.g., for compiling shader programs, or other compilation times, e.g., during software development and/or testing. This disclosure describes techniques that may reduce the amount of time a compiler spends optimizing code during compilation. This disclosure also describes techniques for determining a combination of optimization processes, and parameters for those processes, that are best suited to a particular set of instructions to be compiled. The various techniques of this disclosure may be used alone or together in any combination.

In one example, a method includes determining an allocated time for execution of an optimization pass for optimizing code for a software program, executing at least some instructions of the optimization pass on the code, and, in response to determining that an actual time for execution of the optimization pass has exceeded the allocated time for execution, preventing execution of subsequent instructions of the optimization pass.

In another example, a device includes one or more processors configured to determine an allocated time for execution of an optimization pass for optimizing code for a software program, execute at least some instructions of the optimization pass on the code, and, in response to determining that an actual time for execution of the optimization pass has exceeded the allocated time for execution, preventing execution of subsequent instructions of the optimization pass.

In another example, a device includes means for determining an allocated time for execution of an optimization pass for optimizing code for a software program, means for executing at least some instructions of the optimization pass on the code, and means for preventing, in response to determining that an actual time for execution of the optimization pass has exceeded the allocated time for execution, execution of subsequent instructions of the optimization pass.

In another example, a computer-readable storage medium has stored thereon instructions that, when executed, cause a processor to determine an allocated time for execution of an optimization pass for optimizing code for a software program, execute at least some instructions of the optimization pass on the code, and, in response to determining that an actual time for execution of the optimization pass has exceeded the allocated time for execution, prevent execution of subsequent instructions of the optimization pass.

In another example, a method includes determining a set of optimization pass configuration data for code of a software program to be compiled, wherein the optimization pass configuration data defines a sequence of optimization passes for the software program during compilation, and executing the sequence of optimization passes on code for the software program based on the set of optimization pass configuration data.

In another example, a device includes one or more processors configured to determine a set of optimization pass configuration data for code of a software program to be compiled, wherein the optimization pass configuration data defines a sequence of optimization passes for the software program during compilation, and execute the sequence of optimization passes on code for the software program based on the set of optimization pass configuration data.

In another example, a device includes means for determining a set of optimization pass configuration data for code of a software program to be compiled, wherein the optimization pass configuration data defines a sequence of optimization passes for the software program during compilation, and means for executing the sequence of optimization passes on code for the software program based on the set of optimization pass configuration data.

In another example, a computer-readable storage medium has stored thereon instructions that, when executed, cause a processor to determine a set of optimization pass configuration data for code of a software program to be compiled, wherein the optimization pass configuration data defines a sequence of optimization passes for the software program during compilation, and execute the sequence of optimization passes on code for the software program based on the set of optimization pass configuration data.

The details of one or more examples are set forth in the accompanying drawings and the description below. Other features, objects, and advantages will be apparent from the description and drawings, and from the claims.

DETAILED DESCRIPTION

Figure 1:
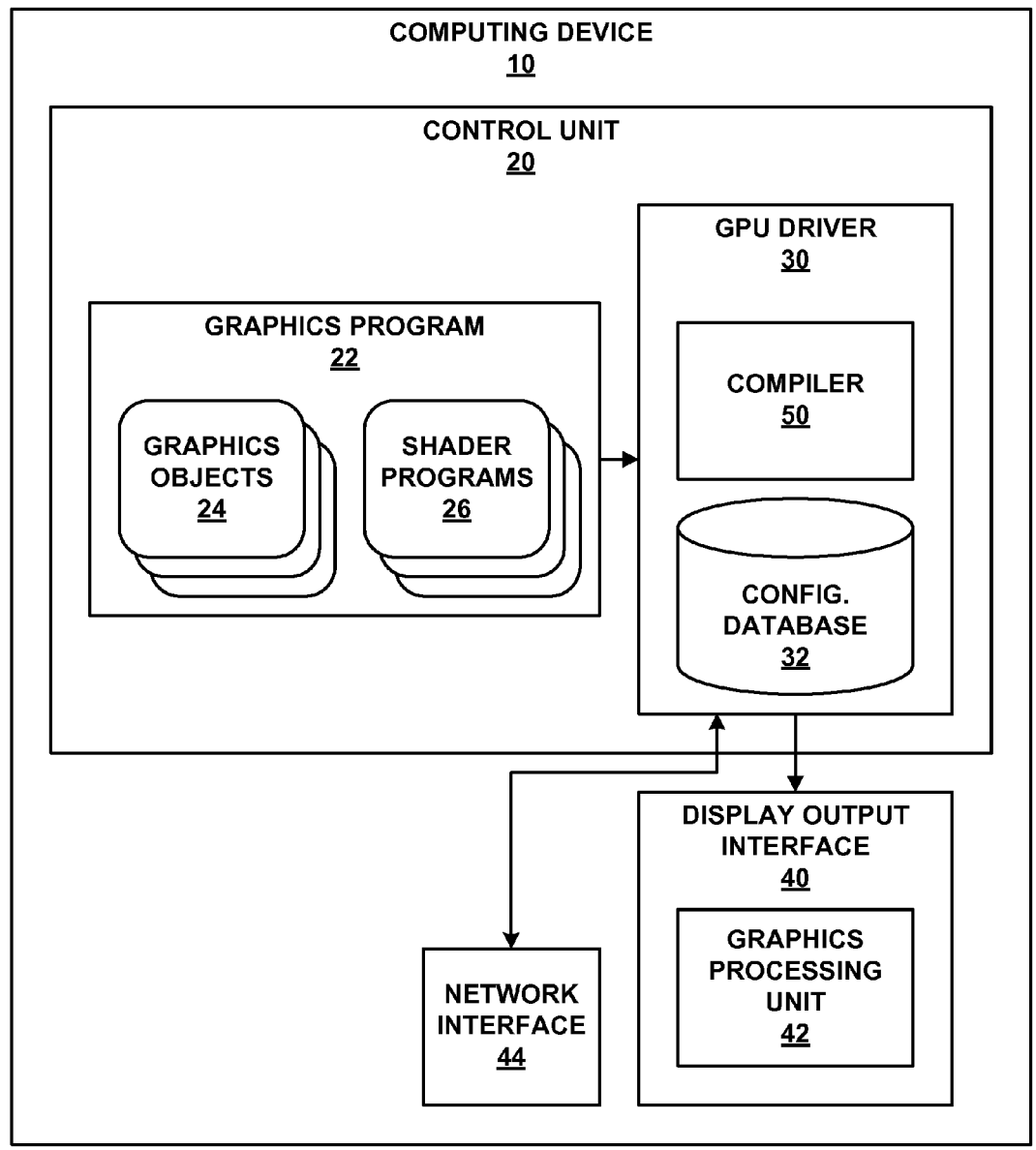
FIG. 1 is a block diagram illustrating an example computing device.

In general, this disclosure describes techniques related to optimization of code for computer programs during compilation. The compilation process typically includes three phases: (1) parsing, in which source code is converted to an intermediate representation; (2) optimization, in which the intermediate representation is transformed to be made better (e.g., in terms of memory consumption, processing efficiency, faster code, improved parallelism, or the like), and (3) code generation, in which the optimized intermediate representation is converted to object code.

Typically, the optimization phase is performed over a series of passes, referred to as optimization passes. For example, the optimization passes may include loop optimization passes, data flow optimization passes, code generator optimization passes, functional language optimization passes, and the like. Some optimization passes are relatively complex with a large impact on the optimized intermediate representation, whereas other passes are relatively simple with a relatively small impact on the optimized representation.

A compiler (which may be implemented in software and executed by one or more hardware-based processors) typically iterates through each optimization pass in sequence. Certain passes (e.g., the more complex passes) may require a relatively large amount of time to finish executing. Although this is acceptable in some cases, such as when a final build of a large software product is being compiled for distribution to customers, in other cases, delay in compilation may result in a reduced user experience.

For example, optimizations performed during just-in-time (JIT) compilation, which is commonly used in computer games, computer animation, web-based programs, and the like, may result in an unacceptable delay between a time when a user requests to begin a program and the time when the program is able to execute. As another example, optimizations performed during a code development cycle may delay the time between when code is compiled and a programmer can test and debug the code. As still another example, on mobile devices such as smartphones and tablet computing devices, battery power may be limited, and an excessive amount of time spent optimizing code may negatively impact battery life.

This disclosure describes certain techniques related to reducing the amount of time consumed during the optimization phase of compilation, which may improve user experience. For example, in accordance with certain techniques of this disclosure, a pass manager of a compiler may be configured with data defining a maximum optimization time (e.g., an optimization time budget) that can be allocated among the various optimization passes. The pass manager may allocate a greater amount of time to more complex passes and less time to simpler passes, allocate equal amounts of time to each pass, or apply various other allocation schemes. This disclosure refers to the "pass manager" as any unit, module, or component, whether implemented in hardware, software, or any combination thereof, that performs the functions ascribed thereto. The compiler may be configured to perform these functions itself, without including a distinct pass manager element. Likewise, a particular element of the compiler, such as a code generator, may be configured to perform the pass management techniques of this disclosure.

In some cases, the pass manager may allow more complex passes to exceed the allocated amount of time, and then reduce the amount of time allocated to other passes in accordance with the excess time spent during the complex passes. In some cases, the pass manager may eliminate certain passes entirely, e.g., by setting the allocated amount of time for a pass to zero.

When the pass manager allocates different amounts of times to different passes, the amount of time allocated to a particular pass may depend on various data. For example, the pass manager may determine an amount of time to allocate to a particular pass based on a priority of the pass (versus other passes), an amount of time remaining in an overall optimization budget, a power state, an importance value indicating importance of optimization for the program being compiled, user preferences, or the like. Configuration data may assign priority values to the various passes. For example, the configuration data may include numeric values representative of priorities of the passes, such that the numeric values can be compared to determine relative priorities among the passes. The power state may comprise various levels of battery power for a battery of a mobile device, e.g., "full charge," "half charge," "quarter charge," "ten percent charge," or the like.

This disclosure also describes other techniques related to improving the optimization phase of compilation through dynamic configuration of the compiler. For example, rather than executing optimization passes in a particular, fixed sequence, this disclosure describes techniques for selectively modifying the sequence of optimization passes, e.g., by reordering the optimization passes, executing the same optimization pass multiple times but with different parameters, and/or eliminating certain optimization passes entirely, based on which program is to be compiled, e.g., based on an identifier for the program and/or based on identifying characteristics of the program to be compiled. The identifier may comprise a file name, a hash of a file for the program, or other identifying information, whereas identifying characteristics may comprise, for example, a file extension, a language in which the program was written, or other identifying characteristics. The sequence of optimization passes, and parameters for the optimization passes, may be determined ahead of time and provided to the compiler. For example, the compiler may be configured to refer to a network resource to request data defining the sequence of optimization passes and parameters for the optimization passes.

FIG. 1 is a block diagram illustrating an example computing device 10. In this example, computing device 10 includes control unit 20 and display output interface 40. Functionality attributed to control unit 20 may be realized using hardware, software, firmware, or any combination thereof. When implemented in software or firmware, it is presumed that requisite hardware, such as computer-readable media for storing software or firmware instructions and one or more processors for executing the instructions, is also provided. For example, control unit 20 may include one or more processors. Likewise, control unit 20 may include one or more computer-readable storage media for storing instructions, which the one or more processors may execute.

In this example, control unit 20 includes graphics program 22 and graphics processing unit (GPU) driver 30. Graphics program 22 may comprise, for example, an animation program, a video game, a graphics development program, or other computer-based graphics generation program. In this example, graphics program 22 includes data defining graphics objects 24 and data defining shader programs 26. Graphics objects 24 generally correspond to graphics objects that can be rendered by a GPU, such as GPU 42 of display output interface 40. Graphics objects 24 may include, for example, definitions of graphics primitives, such as points, lines, triangles, rectangles, and other polygons, as well as structures made up of multiple primitives, such as, for example, two-dimensional or three-dimensional meshes. Graphics objects 24 may correspond to two-dimensional or three-dimensional graphics objects.

Display output interface 40 includes GPU 24, which may render data defining graphics objects 24. The rendering process is performed to generate pixel data, such as values for red-green-blue triplet values for each pixel of an image, from the graphics objects. In this manner, the rendering process referred to by this disclosure is distinct from, for example, decoding an encoded representation of an image, such as decoding a Joint Photographic Experts Group (JPEG) encoded image. That is, whereas decoding an encoded image generally includes decoding encoded pixel data or other data generally representative of pixels of an image, a rendering process generally includes generating pixel data from a higher-order representation of data, such as two- or three-dimensional graphics objects (e.g., graphics primitives), which may, in some examples, further take into account camera viewpoint, lighting effects, and other such factors. Though portions of the image actually displayed following the rendering process may result from decoding an encoded image, at least some portion of the displayed image is generated from graphics processing data, e.g., by applying the graphics processing data during a rendering process.

As part of the rendering process, GPU 42 may execute one or more of shader programs 26. A shader program is a software application that executes on a programmable shader processor core of a GPU to perform a variety of graphics processing functions in a flexible manner. When executed, shader programs 26 may be used for various tasks, such as adding lighting or shadow to pixels generated from graphics objects 24, based on sources of light and positions of graphics objects 24 relative to each other. Various types of shader programs may be used, such as, for example, vertex shaders, geometry shaders, and pixel shaders. In the example of FIG. 1, graphics program 22 includes source code data defining shader programs 26. In other examples, source code data defining one or more shader programs may be stored elsewhere, e.g., as one or more dynamically linked libraries to which graphics program 22 has access. Such dynamically linked libraries may be stored in a computer-readable medium of control unit 20 (not shown in FIG. 1).

GPU driver 30 represents an interface between control unit 20 and GPU 42. GPU driver 30 may be installed within an operating system of computing device 10. In this manner, graphics program 22 can issue commands to GPU 42 via GPU driver 30 to cause computing device 10 to display images on a display coupled to display output interface 40. For example, graphics program 22 can send data for one or more graphics objects 24 and/or data defining one or more of shader programs 26 to GPU 42 via GPU driver 30. In accordance with the techniques of this disclosure, GPU driver 30 may determine a specific configuration for compiler 50 each time compiler 50 is invoked to compile a program (e.g., one of shader programs 26). Additionally or alternatively, compiler 50 may be configured to determine a configuration based on identifying information for a program to be compiled.

Possible configurations for compiler 50 can be stored within a database separate from GPU driver 30, by GPU driver 30 itself, by compiler 50, or in other memory accessible to GPU driver 30. As one example, the configuration data may be stored in a database accessible via a network. In the example of FIG. 1, GPU driver 30 includes configuration database 32, which stores various potential configurations for compiler 50, based on various compilation goals. Although shown within GPU driver 30, it should be understood that configuration database 32 may be stored elsewhere, e.g., within control unit 20 or external to computing device 10. In such examples, GPU driver 30 may retrieve or receive configuration data via an interface configured to retrieve or receive the data. Accordingly, GPU driver 30, or compiler 50, may be configured to determine a particular configuration for compiler 50 based on one or more various compilation goals at a particular time for compilation. For example, if the goal is power saving, GPU driver 30 may select a configuration that reduces optimization passes, e.g., runtime for the passes (that is, the amount of time allocated to the passes for execution) and/or the number of optimization passes that are executed. As an example, GPU driver 30 may select a configuration to save power that eliminates loop optimizations and uses a simple linear scan register allocator. Alternatively, loop optimizations can be preserved for shaders with loops, and GPU driver 30 may configure compiler 50 to use graph-coloring register allocation passes.

Alternatively, if the goal is close-to-optimal code, GPU driver 30 may select a configuration that allows many optimization passes to execute, and a database may store best-known compiler configurations for each of shader programs 26. As still another example, if the goal is memory saving, GPU driver 30 may ensure that optimization passes directed to improving memory utilization are executed, and selectively use or skip other optimization passes. As yet another example, system load may be a consideration. Accordingly, GPU driver 30 may select a configuration for compiler 50 in response to detecting the current system load. For example, GPU driver 30 may check whether the system load is relatively high or relatively low, and select which optimization passes or what version of an optimization pass to execute.

Thus, compiler 50 may produce different object code for the same one of shader programs 26 at different times, based on one or more compilation goals at those respective times. In this manner, GPU driver 30 can dynamically and automatically reconfigure compiler 50 differently, depending on various compilation goals. That is, prior to executing compiler 50, GPU driver 30 may configure compiler 50 using data from configuration database 32, e.g., based on one or more current compilation goals and/or based on a program (e.g., one of shader programs 26) to be compiled.

In the example of FIG. 1, computing device 10 also includes network interface 44. In this example, GPU driver 30 may be configured to use network interface 44 to retrieve compiler configuration data for compiler 50 based on one of shader programs 26 to be compiled. That is, GPU driver 30 may access a network location to retrieve a compiler configuration to use when compiling the one of shader programs 26. Thus, GPU driver 30 may update configuration database 32 using the configuration data retrieved via network interface 44. In some examples, GPU driver 30 may retrieve such configurations periodically, e.g., once per week or once per month, such that an up-to-date compiler configuration is available prior to compilation of shader programs 26.

In the example of FIG. 1, data defining shader programs 26 is stored in the form of source code (that is, uncompiled code). Therefore, in order to be executable by GPU 42, graphics program 22 sends the source code for shader programs 26 to GPU driver 30 for compilation. Accordingly, GPU driver 30 includes compiler 50. Compiler 50 generally corresponds to a program, which can be executed by a processor of control unit 20, that converts the source code for shader programs 26 into object code that can be executed by GPU 42. Thus, shader programs 26 may be compiled during execution of graphics program 22. In other words, source code for shader programs 26 may be compiled just-in-time.

GPU driver 30 and/or compiler 50 may be configured to perform various techniques of this disclosure related to optimization of object code generated by compiler 50. As discussed above, compiler 50 may include definitions of a plurality of different optimization passes. Each optimization pass may be configured to optimize a particular aspect of the code, e.g., memory management, code speed, or the like. Certain optimization passes may be relatively more complicated than others. That is, certain optimization passes may be known to typically require more execution time and/or more computing resources than others. In accordance with the techniques of this disclosure, compiler 50 may be configured to limit the amount of execution time one or more of the optimization passes is permitted to execute.

As an example, compiler 50 may determine an overall optimization time budget and/or one or more individual optimization pass time budgets. A "time budget" generally corresponds to an amount of time during which execution is permitted, such that once the amount of time has been met or exceeded, compiler 50 stops further execution (e.g., of the current optimization pass and/or of subsequent optimization passes). Thus, the overall optimization budget may correspond to a duration of time during which the optimization phase is permitted to execute, e.g., defined in a number of milliseconds, seconds, computing cycles, or the like. Similarly, the individual optimization pass budgets may correspond to durations of time during which respective optimization passes are permitted to execute. During execution of the optimization passes, compiler 50 may monitor the amount of time expended and terminate execution of an optimization pass when the budgeted amount of time has been met or exceeded. Alternatively, compiler 50 may allow certain optimization passes to exceed the budgeted amount of time, but offset the excess by reducing the budget for one or more subsequent optimization passes.

In addition, or in the alternative, compiler 50 may determine different sets of optimization passes (e.g., one or more possible optimization passes that are to be omitted), and orderings of the optimization passes, based on which one of shader programs 26 is being compiled. For example, certain shader programs may be better optimized using a subset of available optimization passes, and moreover, perform execution of those optimization passes in a certain order and/or using certain parameters. Likewise, other shader programs may be better optimized using a different subset of available optimization passes, again in a certain order and/or using certain parameters.

Compiler 50 may be configured to execute these various techniques alone or together. For example, compiler 50 may be configured to determine a subset of available optimization passes to execute based on one of shader programs 26 to be compiled, as well as a time budget for executing the optimization passes. If there is time left in the time budget after completing the subset of optimization passes, compiler 50 may execute additional optimization passes until the time budget has been expended. Alternatively or additionally, compiler 50 may determine individual time budgets for each optimization pass in a selected subset of available optimization passes.

In this manner, compiler 50 may be configured to perform one or more of the techniques of this disclosure related to improving the optimization phase of compilation. That is, following parsing, compiler 50 may optimize a parsed, intermediate representation of source code, e.g., for one of shader programs 26. After optimizing the intermediate representation, in accordance with the techniques of this disclosure, compiler 50 may generate object code using the optimized intermediate representation.

Compiler 50 may generate substantially optimized object code corresponding to the source code of a program, e.g., one of shader programs 26. After generating the object code, GPU driver 30 may cause GPU 42 to execute the object code, e.g., by passing the code to GPU 42 or sending an address of the code, in memory accessible by GPU 42, to GPU 42. Accordingly, GPU 42 may execute the compiled object code for the shader program. For example, while rendering data defining one or more of graphics objects 24, GPU 42 may execute object code for one or more shader programs. After fully rendering an image, display output interface 40 may store data for the image in an image buffer, which may be retrieved by a display device (not shown) for display.

Although the example of FIG. 1 illustrates compiler 50 as being part of a GPU driver, it should be understood that the techniques of this disclosure may be used in other contexts as well. In general, the techniques of this disclosure may be used by any compiler, and not necessarily a compiler of a GPU driver. For example, the techniques of this disclosure may be used by compilers during code development and/or debugging. Likewise, these techniques may be used by other just-in-time compilers, such as compilers for Java.

Figure 2:
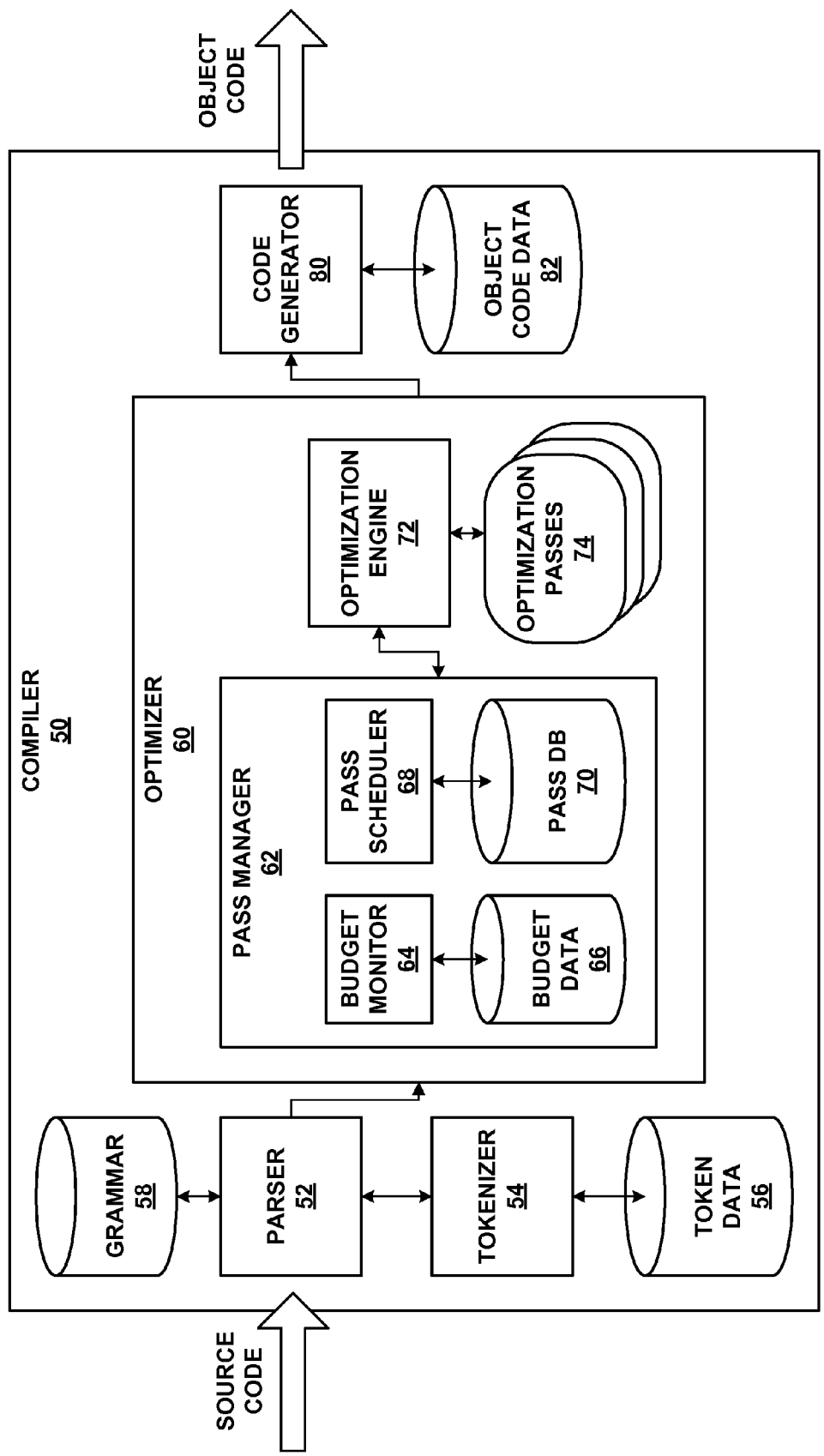
FIG. 2 is a block diagram illustrating an example set of components of a compiler.

FIG. 2 is a block diagram illustrating an example set of components of compiler 50. In the example of FIG. 2, compiler 50 includes parser 52, tokenizer 54, token data 56, grammar 58, optimizer 60, code generator 80, and object code data 82. As explained with respect to FIG. 1, compiler 50 may receive source code of a program, e.g., a shader program. FIG. 2 illustrates source code being received by parser 52. In general, parser 52 parses text (that is, all input characters) of the source code. In the example of FIG. 2, parser 52 uses tokenizer 54 during the parsing process. Tokenizer 54 tokenizes the input source code. Tokenizing generally involves extracting individual tokens from the input source code. Tokens generally correspond to individual semantic units of the source code (e.g., variables, functions, numeric values, commands, operators, symbols, and the like).

Parser 52 may request a next token from tokenizer 54, and in response, tokenizer 54 may return data representative of the next token from the input source code to parser 52. For example, the data representing the next token may comprise a "token text" value and a "token type" value, where the token text is the literal text extracted from the source code, and the token type is a value representing a type for the token text, e.g., pure text, alphanumeric text (text including a combination of letters and numbers), numeric text, symbols, or white space (e.g., spaces, carriage returns, tabs, or the like). Token data 56 defines types for text. In this manner, tokenizer 54 may retrieve all non-white space text between sets of white space, and determine a type for the retrieve text from token data 56. Tokenizer 54 may similarly retrieve white space between non-white space tokens and classify the white space using token data 56, e.g., as a white space token.

After receiving the token data from tokenizer 54, parser 52 may determine semantic meaning for the token. For example, parser 52 may use data defining grammar 58 to determine the semantics for the token. Grammar 58 may comprise a context-free grammar. Parser 52 may comprise a recursive descent parser. Thus, parser 52 may transition between various states based on a current state and a received token, using grammar 58. The various states may influence how parser 52 assigns semantics to each token. Parser 52 may then produce an intermediate representation of the source code, using the semantics determined for the various tokens of the source code.

Parser 52 may then provide the intermediate representation of the source code to optimizer 60. Optimizer 60 may optimize the intermediate representation using one or more of the techniques of this disclosure, alone or in any combination. In general, optimizer 60 may execute one or more of optimization passes 74 to be applied to the intermediate representation. As explained below, optimizer 60 may be configured to ensure that execution of the optimization passes does not exceed a predetermined execution time budget and/or may select a subset of optimization passes 74 to execute to optimize the intermediate representation, e.g., based on an identity of the program being compiled and/or identifying characteristics of the program.

In the example of FIG. 2, optimizer 60 includes pass manager 62 and optimization engine 72. Optimization engine 72 executes various optimization passes 74 at the direction of pass manager 62. Pass manager 62, in turn, includes budget monitor 64 and pass scheduler 68, and maintains budget data 66 and pass database (DB) 70. Budget data 66 may generally define an overall time budget during which the optimization process may execute and/or time budgets for individual ones of optimization passes 74, as well as tracking data related to optimization of a current program being compiled. For example, budget monitor 64 may maintain statistics related to times of execution for previously executed optimization passes 74, a ranking of priorities for optimization passes 74, initial time allocations for optimization passes 74, modified time allocations for optimization passes 74, or the like.

Optimization engine 72 may communicate with pass manager 62 to determine whether to proceed with executing a current one of optimization passes 74, e.g., during execution of the optimization pass or prior to starting execution of the optimization pass. For example, after each instruction, optimization engine 72 may send a message to pass manager 62 to determine whether to proceed with the current optimization pass or to end the current optimization pass. In some cases, if the time for execution of one of optimization passes 74 has elapsed but the optimization pass has not yet finished execution, optimization engine 72 may gracefully terminate execution of the optimization pass, then proceed to either execute a subsequent optimization pass or finish the optimization process.

In this manner, optimizer 60 may prevent excessive compilation times via an automated limiting of optimizations and other transformations applied to an instruction stream. Compiler 50 may be provided with a runtime budget. Pass manager 62 may split this budget across optimization passes 74 and code generator 80. In other words, pass manager 62 may limit the runtime budget of the optimization phase (or execution of compiler 50 itself) to a reasonable execution time, e.g., five seconds. Although code generation may not be as good as if all optimization passes had been completed, the code generation process will still result in correct code and may provide a better user experience by avoiding unreasonable delays between compilation time beginning and completion.

Pass manager 62 may determine the runtime budget using various parameters. Such parameters may include one or more of a speed of a CPU executing compiler 50, a number of cores in the CPU, if compiler 50 is multithreaded, system load, or the like. The total time budget may be allocated among optimization passes 74 using various allocation techniques, as explained in greater detail below. As an example, pass manager 62 may limit per-pass runtime, limit the number of optimization passes to execute, and/or may utilize a dynamic algorithm for determining which of optimization passes 74 to execute, and for how long. In addition, or in the alternative, expensive passes may be replaced with a simpler pass. For example, a complicated scheduler pass may be replaced with a simpler scheduler algorithm, which may produce less efficient code. As an example, a complicated register allocation algorithm that uses graph coloring may be replaced with a simpler algorithm that uses a linear scan.

In some examples, the distribution of the execution time budget among optimization passes 74 can be different when compiler 50 runs different optimization passes with different options in different sequences. Likewise, the total budget and distribution can be different for the same compiler and program at different times due to other external factors, e.g., system load.

In one example, pass manager 62 may be configured to utilize a backoff algorithm when executing optimization passes 74. That is, if there is a total budget of 5 seconds, pass manager 62 may ensure that each of optimization passes 74 runs no longer than 200 ms before optimization engine 72 terminates execution. If such a termination takes place, a telescoping pattern may be employed to cull half of the remaining passes from the remaining pass list. This pattern may be repeated for further pass timeouts, ensuring that the 5 second limit is never reached. The result of a timeout is code generation that is less than optimal. The code will still run correctly, but be less optimized.

In addition or in the alternative to the backoff algorithm described above, pass manager 62 may be configured with a tiered system of time limits for passes. That is, budget data 66 may define different execution times (or percentages of the overall execution time) for different categories of optimization passes 74. For example, optimization engine 72 may be configured to perform a telescopic culling algorithm, in which only complex passes (e.g., loop analysis optimization passes) can take 200 ms each, while simpler passes (e.g., dead code elimination optimization passes) can take only 50 ms. Budget data 66 may also categorize each of optimization passes 74 as either "complex" or "simple," and allocate execution time accordingly. The telescopic culling algorithm may cut out complex optimization passes before shorter optimization passes, transferring leftover complex budget to the simpler passes. This favors simpler passes executing over complex passes. In other words, optimization engine 72 may run half as many "complex" passes after early termination of one of optimization passes 74, depending on the time left in the execution time budget. After all complex passes have been skipped, optimization engine 72 may begin skipping "easy" (simple) passes. This technique can be tweaked for the particular program domain handled by the compiler in question.

Budget data 66 may define various execution time budgets based on various input criteria. For example, budget data 66 may define different execution time budgets based on a language in which the source code to be compiled was written. Such languages may include, for example, OpenGL, OpenCL, DirectX, GLslang, RenderMan Shading Language, or the like.

These techniques may provide various advantages. For example, this technique is automatic, in that no user influence is needed to ensure that the optimization phase does not consume excess execution time. Compiler 50 can therefore spend more time employing complex optimization passes. Thus, a developer of compiler 50 need not be concerned about worst case runtime of optimization passes on large (though rare) programs. This allows compiler 50 to optimize for the average (and perhaps best) case, as opposed to the worst case. Likewise, these techniques may allow for fine grained control, e.g., 20 ms budget for graphics programs (e.g., programs written in OpenGL) and 5 seconds for computation programs (e.g., programs written in OpenCL) program optimization.

Additionally, during code generation, more complex and time consuming passes may be placed into the compiler pipeline without having to handle rare edge conditions, such as a source program with a deeply nested function call flow. Based on the runtime of simpler optimization passes, pass manager 62 may estimate how much time is available for more aggressive optimization passes, and add these to the pipeline. Possible modifications may include more aggressive loop analysis and/or more aggressive register allocation and instruction scheduling.

The time budgeting algorithms can also be adjusted according to one or more various system goals. That is, different optimization pass parameter profiles can be developed for achieving various system goals, and can be stored in budget data 66. For example, one goal is to save power, e.g., in battery powered devices. By employing a power saving profile as a compilation time limiter, pass manager 62 may attempt to ensure that compiler 50 has the maximum ability to consume power efficiently. For example, efficient compilation time for the purpose of power saving may correspond to 5 seconds of CPU time.

Heuristic testing during development of the techniques of this disclosure identified various programs that take a relatively long time to compile, due to the nature of the source code patterns and the complexity of optimization passes applied to them, without applying the techniques of this disclosure. That is, absent the techniques of this disclosure, there can be a long delay between compilation start time and completion time. For example, some shader programs contain complex patterns that cause opt (that is, the compilation optimization phase) and codegen (that is, the generation of object code, following optimization) to consume enormous amounts of CPU time, which may result in execution of compiler 50 "locking up," that is, failing to complete within a reasonable time. In the case of GPU shaders and kernels, this can also delay the start of a program (e.g., a game using the shaders or an operating system using the kernel). Thus, compilation delays (e.g., delays caused by optimization) can result in a poor user experience. In some extreme cases, a compiler without the techniques of this disclosure may cause the user interface of a process to "lock up."

As one example, testing of compilation of an example bitcoin program, written in OpenCL (Open Computing Language), took over an hour to compile on an 8064 GPU compiler. In this example, the bitcoin miner was phatk2.cl, and the compiler was an OpenCL compiler. Not only does such a delay cause a poor user experience, but malicious users may write source code in such a way as to exploit such delays, and thus, cause a denial-of-service attack. Accordingly, compilation delays may pose potential security risks. Thus, utilizing the techniques of this disclosure may avoid such delays, resulting in improved user experience, and also provide enhanced security. That is, the execution time limiting techniques of this disclosure may protect against compiler 50 consuming too much CPU time.

In addition, or in the alternative, pass manager 62 may select a subset of optimization passes 74, such that the subset includes optimization passes that, for most programs, will not consume excess time. That is, pass manager 62 may record statistics for various ones of optimization passes 74 to determine average times consumed during execution, as well as a relative amount of optimization achieved by executing the optimization passes (e.g., how well the optimization passes achieve memory utilization, improve loops, improve execution speed, or the like). Pass manager 62 may then eliminate those optimization passes that consume excess execution time without sufficiently optimizing the source code.

In addition, or in the alternative, a CPU executing compiler 50, during the optimization phase, may spawn one or more new threads for various optimization phases. The CPU (e.g., executing GPU driver 30) could detect if the compilation thread went over the time limit, and then kill the thread upon determining that the thread exceeded the time limit.

Implementation of the techniques of this disclosure may avoid user perceptible delay when compilation times get too high, while retaining normal compilation behavior in the majority of situations. When compilation times could have been excessive, instead of apparent non-response, the user may see that the program resulting from compilation of the source code does not run as quickly on the GPU (or CPU, in some cases).

In addition to, or in the alternative to, the compilation time limiter techniques described above, compiler 50 may also be configured to select a subset of optimization passes 74 to execute, based on a particular program to be compiled. Thus, in addition to (or in the alternative to) conventional compiler options available to a user to modify optimization behavior (e.g., -O2, -O3, -Os, and -no-inline switches that may be passed to the compiler as arguments), pass manager 62 may automatically select one or more options for modifying the optimization behavior, e.g., without user input. In other words, rather than executing a fixed sequence of optimization passes for every input source code program, optimizer 60 may perform optimization passes dynamically, e.g., based on a program to be compiled. Moreover, optimizer 60 may perform optimization passes 74, or a subset thereof, in a particular order, multiple times, with various parameters, or other modifications based on, e.g., the program to be compiled.

Pass database 70 includes data that defines one or more of orderings for optimization passes 74, whether one or more of optimization passes 74 should be executed multiple times with different parameters (as well as the parameters to be used for such passes), whether one or more of optimization passes 74 should be skipped. Pass database 70 may store one or more combinations of such data for various configurations. In some examples, a driver (e.g., GPU driver 30 of FIG. 1) may select one of the configuration stored in pass database 70, or send instructions to compiler 50 as to which of the configurations to retrieve from pass database 70. In addition, pass database 70 may also include a mapping to budget data 66, to define execution time budgets for any or all of the optimization passes to be executed and/or an overall time budget for the optimization phase.

Optimization engine 72 may communicate with pass manager 62 to determine which of optimization passes 74 to execute next in a sequence of optimization passes. In addition, pass scheduler 68 may provide parameters to optimization engine 72 for one or more of optimization passes 74, e.g., when one or more of optimization passes 74 is to be executed multiple times with different parameters. That is, compiler 50 (which may correspond to a compiler for a GPU, such as GPU 42 of FIG. 1) may be structured in a flexible manner, so that one or more of optimization passes 74 may be omitted, optimization passes 74 can be run in various different orders, different numbers of times, and/or with different parameters for each pass.

The preferred optimization pass configuration data may be defined specifically for the program or characteristics of the program, for characteristics of a device that executes the program, and/or for one or more current compilation goals. For example, different sets of preferred optimization pass configuration data may be defined based on whether a device configured to compile source code for the program is a personal computer, a smartphone, a tablet computer, a laptop computer, or the like. In this manner, the preferred optimization pass configuration data may be individually tailored for the device that will be performing compilation, such that the preferred optimization pass configuration data results in desired compilation optimization characteristics for the program and the device. As discussed with respect to FIG. 1, the preferred optimization pass configuration data may be stored separately from compiler 50, e.g., within configuration database 32 (FIG. 1).

Following execution of one or more optimization passes 74, optimizer 60 provides the optimized intermediate representation to code generator 80. It should be understood that "optimized intermediate representation" does not necessarily mean that the intermediate representation has been fully optimized. Instead, "optimized intermediate representation" should be understood to refer to the intermediate representation, produced by parser 52, as processed by optimizer 60. That is, optimizer 60 might not have executed all of optimization passes 74, may have terminated execution of one or more of optimization passes 74 prematurely, and/or may not have selected parameters for one or more of optimization passes 74 that results in the most optimal intermediate representation. However, optimizer 60 may have performed such actions to ensure that the optimization phase does not consume excess time and/or to comply with other compilation goals, e.g., power savings, complying with current system load, or the like.

Code generator 80 receives the optimized intermediate representation from optimizer 60 and uses object code data 82 to translate the optimized intermediate representation into object code. Object code data 82 may define object code structure, form, content, and the like, for a particular processor, such as GPU 42 (FIG. 1). That is, object code data 82 may define syntax and semantics for well-formed object code that can be executed by the corresponding processor. Thus, code generator 80 may generate object code in a form that can be executed by the corresponding processor, using object code data 82. Although optimizer 60 is described as performing optimization passes, code generator 80 may also (that is, additionally or alternatively) be configured to perform one or more optimization passes.

As an example, the optimized intermediate representation may include data defining a "do-while" loop. Code generator 80, using object code data 82, may translate the data defining the "do-while" loop into a series of instructions within the loop, a truth comparison operation, and a jump instruction that causes the processor to return to the address at the beginning of the series of instructions if the truth comparison operation returns a "true" value (e.g., a non-zero value). As another example, the optimized intermediate representation may include data defining an "if-else" statement. Code generator 80, using object code data 82, may translate the data defining the "if-else" statement into a truth comparison operation, a first jump operation that causes the processor to jump to the address of a first series of instructions if the truth comparison operation yields a "true" value, a second jump operation that causes the processor to jump to the address of a second series of instructions if the truth comparison yields a "false" value, data for the first series of instructions followed by a jump operation that causes the processor to jump to the address following the second series of instructions, and data for the second series of instructions.

In this manner, computing device 10 (FIG. 1) represents an example of a device including one or more processors configured to determine an allocated time for execution of an optimization pass for optimizing code for a software program, execute at least some instructions of the optimization pass on the code, and, in response to determining that an actual time for execution of the optimization pass has exceeded the allocated time for execution, preventing execution of subsequent instructions of the optimization pass.

Likewise, computing device 10 (FIG. 1) represents an example of a device including one or more processors configured to determine a set of optimization pass configuration data for code of a software program to be compiled, wherein the optimization pass configuration data defines a sequence of optimization passes for the software program during compilation, and execute the sequence of optimization passes on code for the software program based on the set of optimization pass configuration data.

The example of compiler 50 of FIG. 2 is discussed in the context of computing device 10 of FIG. 1, in which compiler 50 represents a compiler that generates object code for GPU 42. However, it should be understood that the techniques of this disclosure may be applied to compilers for general purpose CPUs as well. Thus, in various examples, a compiler implementing the techniques of this disclosure may comprise a compiler for a GPU programming language, such as OpenGL, OpenCL, or DirectX, a compiler for a shader language, such as GL shading language (GLslang), or the RenderMan Shading Language, or a general programming language, such as C/C++, C#, Ruby, Fortran, Haskell, Cython, Objective-C, and the like.

Figure 3:
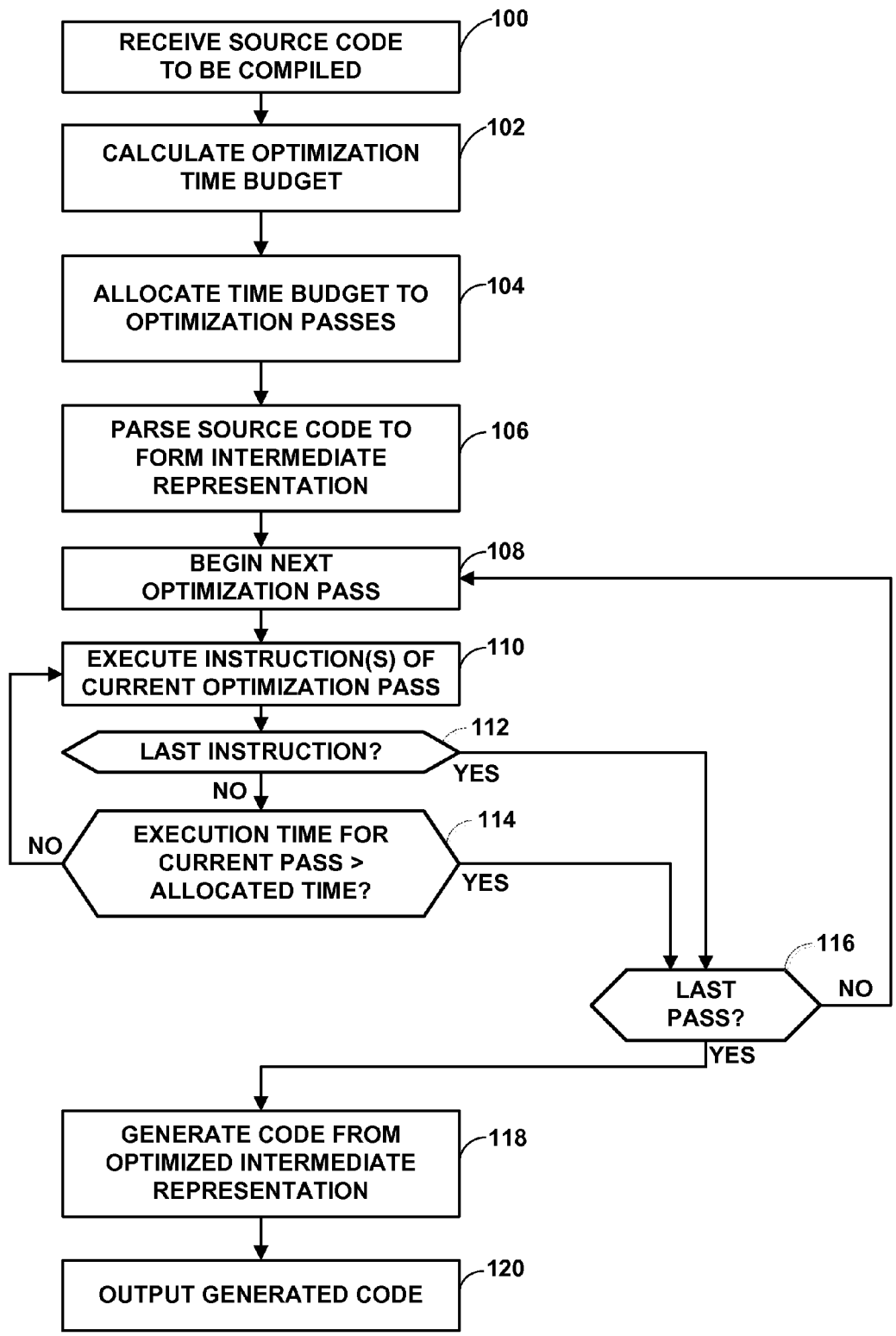
FIG. 3 is a flowchart illustrating an example method for using a time budget for an optimization phase of compilation in accordance with the techniques of this disclosure.

FIG. 3 is a flowchart illustrating an example method for using a time budget for the optimization phase of compilation in accordance with the techniques of this disclosure. For purposes of example, the method of FIG. 3 is explained with respect to elements of FIGS. 1 and 2, e.g., control unit 20 (which may include a processor), GPU driver 30, and compiler 50. However, it should be understood that a similar method may be performed by other devices and components, e.g., components for compiling code for a general purpose processor, rather than a GPU.

Initially, GPU driver 30 may receive source code to be compiled (100). In the example of FIG. 1, the source code may correspond to source code for one of shader programs 26. The source code may conform to a graphics programming language, such as a shader language. Depending on various factors, GPU driver 30 may calculate an optimization time budget (102), that is, an allocated amount of time during which compiler 50 can perform the optimization phase of compilation. This time may be, for example, five seconds, ten seconds, or the like, and may be expressed in seconds, milliseconds, clock ticks, or the like.

GPU driver 30 may calculate the optimization time budget based on one or more various factors, such as, for example, user preferences, system load, power considerations, an identifier of the program to be compiled, or other factors. GPU driver 30 may then provide data indicative of the optimization time budget to compiler 50. Compiler 50 may then allocate the time budget to one or more of optimization passes 74 (104). In some examples, compiler 50 may allocate the time among the optimization passes equally. If an optimization pass ends before the allocated time, compiler 50 may allocate the remaining time to one or more subsequent optimization passes.

Compiler 50 may then parse the source code to form an intermediate representation (106). In particular, parser 52 may utilize tokenizer 54 to retrieve tokens from the source code, and grammar 58 to determine semantics for the tokens, when forming the intermediate representation. The intermediate representation may comprise one or more data structures stored in memory of compiler 50 representative of the source code. Parser 52 may then provide the intermediate representation to optimizer 60 for optimization.

Optimizer 60 may cause pass manager 62 to manage optimization engine 72, in accordance with the allocation of the optimization time budget. Pass manager 62 may initially cause optimization engine 72 to begin a first optimization pass (108), and to start a timer corresponding to the allocated portion of the optimization time budget for the first optimization pass. Optimization engine 72 may then execute one or more instructions of the optimization pass (110). Optimization engine 72 may then determine whether the instruction is the last instruction of the optimization pass (112). If the executed instruction is not the last instruction ("NO" branch of 112), optimization engine 72 may query pass manager 62 as to whether the execution time for the current optimization pass has exceeded the allocated time for execution of the current optimization pass (114).

If the execution time for the current pass has not exceeded the allocated time for the current optimization pass ("NO" branch of 114), optimization engine 72 may proceed to execute one or more subsequent instructions of the current optimization pass (110). On the other hand, if the previously executed instruction was the last instruction of the optimization pass ("YES" branch of 112) or if the execution time for the current pass has exceeded the allocated time for the current optimization pass ("YES" branch of 114), optimization engine 72 may terminate the optimization pass, and pass manager 62 may determine whether the previous optimization pass was the last optimization pass to be executed (116). In this manner, if the actual time for execution of the optimization pass has exceeded the allocated time for execution of the optimization pass (per the "YES" branch of 114), compiler 50 may prevent execution of subsequent instructions of the optimization pass.

In the example of FIG. 3, pass manager 62 terminates execution of an optimization pass after the execution time for the optimization pass exceeds an allocated time for the optimization pass. However, it should be understood that in other examples, pass manager 62 may allow one or more optimization passes to exceed the allocated time, and to adjust allocated times for one or more subsequent optimization passes to make up for the difference. Thus, pass manager 62 may be configured to adjust allocated times for one or more subsequent optimization passes based on the actual time for execution of a current (and/or one or more previous) optimization pass(es).

If the previous optimization pass was not the last optimization pass ("NO" branch of 116), pass manager 62 may cause optimization engine 72 to begin a next optimization pass (108), and restart a timer for the amount of time allocated to this next optimization pass. On the other hand, after executing the last optimization pass ("YES" branch of 116), optimizer 60 may provide the optimized intermediate representation to code generator 80, which may generate object code from the optimized intermediate representation (118). Compiler 50 may then output the generated code (120), e.g., by providing the generated code to GPU 42 (FIG. 1).

In this manner, the method of FIG. 3 represents an example of a method including determining an allocated time for execution of an optimization pass for optimizing code for a software program (e.g., an intermediate representation of code that is to be compiled), executing at least some instructions of the optimization pass on the compiled code, and, in response to determining that an actual time for execution of the optimization pass has exceeded the allocated time for execution, preventing execution of subsequent instructions of the optimization pass. The method may further include generating compiled code (that is, object code) for the software program from the optimized code.

Figure 4:
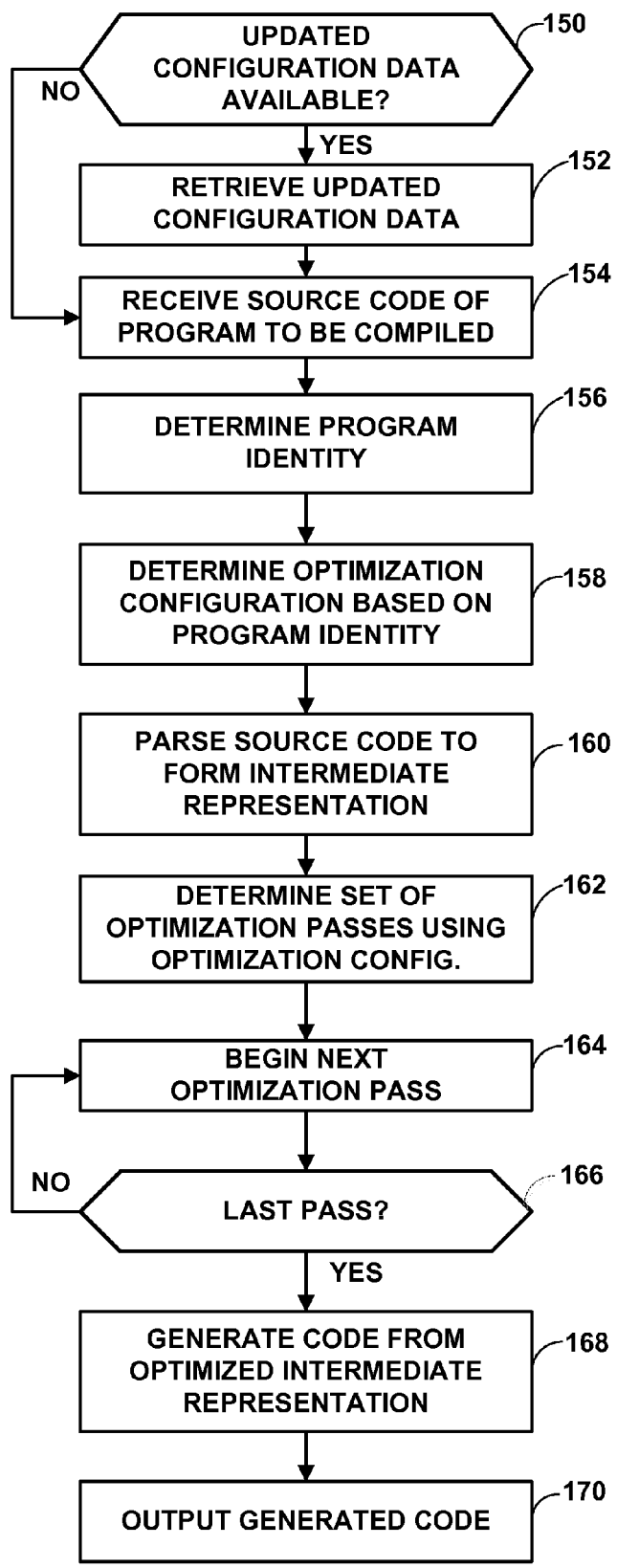
FIG. 4 is a flowchart illustrating an example method for dynamically configuring a compiler in accordance with the techniques of this disclosure.

FIG. 4 is a flowchart illustrating an example method for dynamically configuring a compiler in accordance with the techniques of this disclosure. For purposes of example, the method of FIG. 4 is explained with respect to elements of FIGS. 1 and 2, e.g., control unit 20 (which may include a processor), GPU driver 30, and compiler 50. However, it should be understood that a similar method may be performed by other devices and components, e.g., components for compiling code for a general purpose processor, rather than for a GPU.

GPU driver 30 may be configured to periodically determine whether configuration database 32 should be updated. For example, GPU driver 30 may be configured to check for updates to configuration database 32 monthly, weekly, daily, or at other intervals. Thus, GPU driver 30 may determine whether updated configuration data is available (150), e.g., from a configuration database, which may be accessible at a network location. If updated configuration data is available ("YES" branch of 150), GPU driver 30 may retrieve the updated configuration data (152), e.g., from a network location. For example, GPU driver 30 may maintain, in configuration database 32, records of various programs that have previously been compiled or that will be compiled in the future, such as any or all of shader programs 26. GPU driver 30 may also update configuration database 32 with the retrieved updated optimization information.

If updated configuration data is not available ("NO" branch of 150), or after updating configuration database 32, GPU driver 30 may receive source code of a program to be compiled (154). The source code may correspond to one of shader programs 26, in the examples of FIGS. 1 and 2. GPU driver 30 may further determine an identity of the program (156) to be compiled. For example, GPU driver 30 may determine a name of the program, a hash of the program, or other identifying information for the program. GPU driver 30 may then determine optimization configuration information based on the program identity (158). Additionally or alternatively, GPU driver 30 may determine optimization configuration information based on identifying characteristics of the program, such as, for example, a language in which the program was written, an extension to a file name for a file for the program, or the like.

That is, GPU driver 30 may query configuration database 32 using the determined identity of the program to be compiled and configure compiler 50 with configuration information that configuration database 32 associates with the identity of the program. This information may indicate, for example, which of optimization passes 74 to execute for the program, whether any of optimization passes 74 should be executed multiple times, parameters for the optimization passes to be executed, an order in which the optimization passes are to be executed, and the like. In addition, the configuration information may indicate, or GPU driver 30 may determine, a time budget for executing the optimization phase of compilation, which may be used as discussed with respect to FIG. 3 above.

After configuring compiler 50 as discussed above, GPU driver 30 may provide the source code for the program to compiler 50 for compilation. Thus, parser 52 may receive the source code and parse the source code to form an intermediate representation (160). In particular, parser 52 may utilize tokenizer 54 to retrieve tokens from the source code, and grammar 58 to determine semantics for the tokens, when forming the intermediate representation. The intermediate representation may comprise one or more data structures stored in memory of compiler 50 representative of the source code. Parser 52 may then provide the intermediate representation to optimizer 60 for optimization.

Optimizer 60 may determine configuration information for optimization as stored in, e.g., pass database 70. This information may indicate which of optimization passes 74 are to be executed, as discussed above. Thus, pass manager 62 may determine, from pass database 70, which of optimization passes 74 are to be executed, an order in which the optimization passes are to be executed, parameters for executing the optimization passes, whether certain optimization passes should be executed multiple times, or the like. In this manner, pass manager 62 may determine a set of optimization passes to execute using the optimization configuration information (162). In some examples, one or more optimization passes 74 may accept parameters that change the behavior of the respective pass. For example, such parameters may specify an unroll factor or scheduling strategy for the optimization pass. In such cases, pass manager 62 may select appropriate parameters in a manner that is substantially similar to the manner in which pass manager 62 selects which passes are to be executed. That is, pass database 70 may include data defining values for the various parameters to be passed to optimization passes 74.

Pass scheduler 68 may then begin a next optimization pass (164), in that pass scheduler 68 may schedule a first one of the determined optimization passes for execution, and optimization engine 72 may execute the optimization pass. That is, optimization engine 72 may modify the received intermediate representation of the program through execution of an optimization pass, using the parameters for the optimization pass as determined by the optimization configuration information. After finishing execution of the optimization pass, pass manager 62 may determine whether the recently completed optimization pass was the last pass (166).

If the recently completed optimization pass was not the last pass ("NO" branch of 166), pass manager 62 may cause optimization engine 72 to execute a subsequent optimization pass. On the other hand, if the recently completed optimization pass was the last pass ("YES" branch of 166), pass manager 62 may cause optimizer 60 to provide the optimized intermediate representation to code generator 80. In addition, as discussed with respect to FIG. 3, pass manager 62 may also maintain a time budget for the optimization phase and provide the optimized intermediate representation to code generator 80 after the time budget expires even if not all of the determined optimization passes have completed. Although optimizer 60 is generally described as performing optimization passes, it should be understood that code generator 80 may also (that is, additionally or alternatively) be configured to perform optimization passes. In this manner, code generator 80 may be configured to implement one or more of the techniques of this disclosure.

After code generator 80 obtains the optimized intermediate representation (or after code generator 80 optimizes the intermediate representation), code generator 80 may generate object code from the optimized intermediate representation (168). Generating the object code may correspond substantially to the discussion of step 118 of FIG. 3. Code generator 80 may also output the generated code (170), e.g., to GPU 42.

In this manner, the method of FIG. 4 represents an example of a method including determining a set of optimization pass configuration data for a program to be compiled, wherein the optimization pass configuration data defines a sequence of optimization passes for the program during compilation, and executing the sequence of optimization passes on code for the program based on the set of optimization pass configuration data.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   determining, by a processor, a budget time for execution of a first optimization pass of a plurality of optimization passes for optimizing code for a software program during an optimization phase of compilation of the code;
   determining, by the processor, a first actual time for execution of the first optimization pass;
   determining, by the processor, an allocated time for execution of a second optimization pass of the plurality of optimization passes based at least in part on whether the first actual time for execution exceeded the budgeted time for execution of the first optimization pass, wherein the second optimization pass defines a first number of instructions;

executing, by the processor, a second number of the instructions of the second optimization pass on the code to produce optimized code from the code for the software program, wherein the second number is less than the first number;

in response to determining that an actual time for execution of the second optimization pass has exceeded the allocated time for execution, preventing, by the processor, execution of subsequent instructions of the second optimization pass; and after preventing execution of the subsequent instructions, generating object code for the software program from the optimized code.

2. The method of claim 1, wherein determining the allocated time comprises determining the allocated time based on at least one of a priority of the second optimization pass, an amount of time remaining in an overall optimization time budget, a power state for a device executing the second optimization pass, an importance value assigned to optimization for the program, and user preferences.

3. The method of claim 1, further comprising adjusting allocated times for one or more subsequent optimization passes of the optimization phase based on the actual time for execution.

4. The method of claim 1, further comprising:
determining a time budget for executing the plurality of optimization passes of the optimization phase; and
allocating portions of the time budget to the plurality of optimization passes.

5. The method of claim 1, wherein the second optimization pass comprises a current optimization pass, the method further comprising:
prior to executing the current optimization pass:
determining a set of optimization pass configuration data for the code of the software program, wherein the optimization pass configuration data defines a sequence of optimization passes of the plurality of optimization passes for the program during the optimization phase of compilation, wherein the sequence of optimization passes includes the current optimization pass; and
determining a time budget for executing the sequence of optimization passes; and
when the current optimization pass is not the last optimization pass in the sequence and after finishing execution of the current optimization pass, executing a next optimization pass in the sequence of optimization passes based on the set of optimization pass configuration data.

6. A device comprising one or more processors configured to determine a budgeted time for execution of a first optimization pass of a plurality of optimization passes for optimizing code for a software program during an optimization phase of compilation of the code, determine a first actual time for execution of a first optimization pass of the optimization passes, determine an allocated time for execution of a second optimization pass of the plurality optimization passes based at least in part on whether the first actual time for execution exceeded the budgeted time for execution of the first optimization pass, wherein the second optimization pass defines a first number of instructions, execute a second number of the instructions of the second optimization pass on the code to produce optimized code from the code for the software program, wherein the second number is less than the first number, in response to determining that an actual time for execution of the second optimization pass has exceeded the allocated time for execution, prevent execution of subsequent instructions of the second optimization pass, and after preventing execution of the subsequent instructions, generate object code for the software program from the optimized code.

7. The device of claim 6, wherein the one or more processors are configured to determine the allocated time based on at least one of a priority of the second optimization pass, an amount of time remaining in an overall optimization time budget, a power state for the device, an importance value assigned to optimization for the program, and user preferences.

8. The device of claim 6, wherein the one or more processors are further configured to adjust allocated times for one or more subsequent optimization passes of the optimization phase based on the actual time for execution.

9. The device of claim 6, wherein the one or more processors are further configured to determine a time budget for executing the plurality of optimization passes of the optimization phase, and allocate portions of the time budget to the plurality of optimization passes.

10. The device of claim 6, wherein the second optimization pass comprises a current optimization pass, and wherein the one or more processors are further configured to, prior to executing the current optimization pass, determine a set of optimization pass configuration data for the code of the software program, wherein the optimization pass configuration data defines a sequence of optimization passes of the plurality of optimization passes for the program during the optimization phase of compilation, wherein the sequence of optimization passes includes the current optimization pass, and determine a time budget for executing the sequence of optimization passes, wherein when the current optimization pass is not the last optimization pass in the sequence and after finishing execution of the current optimization pass, the one or more processors are configured to execute a next optimization pass in the sequence of optimization passes based on the set of optimization pass configuration data.

11. The device of claim 6, further comprising a graphics processing unit (GPU), wherein the software program comprises a shader program for the GPU, and wherein the one or more processors are configured to provide compiled code for the shader program to the GPU.

12. A device comprising:
means for determining a budgeted time for execution of a first optimization pass of a plurality of optimization passes for optimizing code for a software program during an optimization phase of compilation of the code;
means for determining a first actual time for execution of the first optimization pass;
means for determining an allocated time for execution of a second optimization pass of the plurality of optimization passes based at least in part on whether the first actual time for execution exceeded the budgeted time for execution of the first optimization pass, wherein the second optimization pass defines a first number of instructions;
means for executing a second number of the instructions of the second optimization pass on the code to produce optimized code from the code for the software program, wherein the second number is less than the first number;
means for preventing, in response to determining that an actual time for execution of the second optimization pass has exceeded the allocated time for execution, execution of subsequent instructions of the second optimization pass; and means for generating, after preventing execution of the subsequent instructions, object code for the software program from the optimized code.

13. The device of claim 12, wherein the means for determining the allocated time comprises means for determining the allocated time based on at least one of a priority of the second optimization pass, an amount of time remaining in an overall optimization time budget, a power state for a device executing the second optimization pass, an importance value assigned to optimization for the program, and user preferences.

14. The device of claim 12, further comprising means for adjusting allocated times for one or more subsequent optimization passes of the optimization phase based on the actual time for execution.

15. The device of claim 12, further comprising:
means for determining a time budget for executing the plurality of optimization passes of the optimization phase; and
means for allocating portions of the time budget to the plurality of optimization passes.

16. The device of claim 12, wherein the second optimization pass comprises a current optimization pass, further comprising:
means for determining, prior to executing the current optimization pass, a set of optimization pass configuration data for the code of the software program, wherein the optimization pass configuration data defines a sequence of optimization passes of the plurality of optimization passes for the program during the optimization phase of compilation, wherein the sequence of optimization passes includes the current optimization pass;
means for determining a time budget for executing the sequence of optimization passes; and
means for executing, when the current optimization pass is not the last optimization pass in the sequence and after finishing execution of the current optimization pass, a next optimization pass in the sequence of optimization passes based on the set of optimization pass configuration data.

17. A non-transitory computer-readable storage medium having stored thereon instructions that, when executed, cause a processor to:
Determine a budgeted time for execution of a first optimization pass of a plurality of optimization passes for optimizing code for a software program during an optimization phase of compilation of the code;
Determine a first actual time for execution of the first optimization pass;
Determine an allocated time for execution of a second optimization pass of the plurality of optimization passes based at least in part on whether the first actual time for execution exceeded the budgeted time for execution of the first optimization pass, wherein the second optimization pass defines a first number of instructions;
execute a second number of the instructions of the second optimization pass on the code to produce optimized code from the code for the software program, wherein the second number is less than the first number;
in response to determining that an actual time for execution of the second optimization pass has exceeded the allocated time for execution, prevent execution of subsequent instructions of the second optimization pass; and
after preventing execution of the subsequent instructions, generate object code for the software program from the optimized code.

18. The computer-readable storage medium of claim 17, wherein the instructions that cause the processor to determine the allocated time comprise instructions that cause the processor to determine the allocated time based on at least one of a priority of the second optimization pass, an amount of time remaining in an overall optimization time budget, a power state for a device executing the second optimization pass, an importance value assigned to optimization for the program, and user preferences.

19. The computer-readable storage medium of claim 17, further comprising instructions that cause the processor to adjust allocated times for one or more subsequent optimization passes of the optimization phase based on the actual time for execution.

20. The computer-readable storage medium of claim 17, further comprising instructions that cause the processor to:
determine a time budget for executing the plurality of optimization passes of the optimization phase; and
allocate portions of the time budget to the plurality of optimization passes.

21. The computer-readable storage medium of claim 17, wherein the second optimization pass comprises a current optimization pass, further comprising instructions that cause the processor to:
prior to executing the current optimization pass:
determine a set of optimization pass configuration data for the code of the software program, wherein the optimization pass configuration data defines a sequence of optimization passes of the plurality of optimization passes for the program during the optimization phase of compilation, wherein the sequence of optimization passes includes the current optimization pass; and
determine a time budget for executing the sequence of optimization passes; and
when the current optimization pass is not the last optimization pass in the sequence and after finishing execution of the current optimization pass, execute a next optimization pass in the sequence of optimization passes based on the set of optimization pass configuration data.

* * * * *